(12) United States Patent
Banerjee et al.

(10) Patent No.: US 8,451,834 B2
(45) Date of Patent: May 28, 2013

(54) DETERMINING AVAILABILITY OF A DESTINATION FOR COMPUTER NETWORK COMMUNICATIONS

(75) Inventors: Dwip N. Banerjee, Austin, TX (US); Ranadip Das, Austin, TX (US); Ketan P. Pancholi, Austin, TX (US); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 368 days.

(21) Appl. No.: 12/187,211

(22) Filed: Aug. 6, 2008

(65) Prior Publication Data

US 2008/0294795 A1 Nov. 27, 2008

Related U.S. Application Data

(63) Continuation of application No. 10/988,291, filed on Nov. 12, 2004, now Pat. No. 7,440,453.

(51) Int. Cl.
*H04L 12/28* (2006.01)
(52) U.S. Cl.
USPC .......................................... 370/389; 370/401

(58) Field of Classification Search
USPC .......................... 370/389, 392, 401, 410, 465
See application file for complete search history.

(56) References Cited

U.S. PATENT DOCUMENTS

| | | | | |
|---|---|---|---|---|
| 6,049,825 A * | 4/2000 | Yamamoto | ..................... | 709/221 |
| 6,680,942 B2 * | 1/2004 | Mead et al. | ................... | 370/392 |
| 6,959,333 B2 * | 10/2005 | Beaumont et al. | ............ | 709/223 |
| 6,973,102 B2 * | 12/2005 | Karagiannis et al. | ......... | 370/516 |
| 7,162,740 B2 * | 1/2007 | Eastlake, III | ................... | 726/23 |
| 7,304,959 B1 * | 12/2007 | Swaroop et al. | .............. | 370/252 |
| 7,336,615 B1 * | 2/2008 | Pan et al. | ...................... | 370/248 |
| 2002/0023150 A1 * | 2/2002 | Osafune et al. | ............... | 709/221 |
| 2003/0108054 A1 * | 6/2003 | Williams et al. | .............. | 370/401 |

\* cited by examiner

*Primary Examiner* — Ricky Ngo
*Assistant Examiner* — Christine Ng
(74) *Attorney, Agent, or Firm* — James L. Baudino; Matthew B. Talpis

(57) ABSTRACT

Determining availability of a destination for computer network communications that include providing on a caching device a destination availability cache comprising at least one cache entry representing availability of a destination and providing, from the caching device to a source, through computer network communications, information indicating the availability of the destination. In typical embodiments, the cache entry comprises a network address of a destination device and a time limitation for the cache entry.

4 Claims, 5 Drawing Sheets

DETERMINING AVAILABILITY OF A DESTINATION FOR COMPUTER NETWORK COMMUNICATIONS

CROSS-REFERENCE TO RELATED APPLICATION

This application is a continuation application of and claims priority from U.S. patent application Ser. No. 10/988,291 filed on Nov. 12, 2004.

BACKGROUND OF THE INVENTION

1. Field of the Invention

The field of the invention is data processing, or, more specifically, methods, systems, and products for determining availability of a destination for computer network communications.

2. Description of Related Art

An ICMP echo message is commonly used to determine availability of a destination for computer network communications. An ICMP echo reply message represents the fact that the destination is available for computer network communications. When many clients or sources on a network attempt to gather availability information about many destinations, each source may generate many ICMP echo messages, each destination may generate many ICMP echo reply messages, many routers may be in many data communications routes between the sources and the destinations, and network performance suffers. This situation is common enough so that some system administrators disable the ICMP service on routers under their jurisdiction. This is practice that causes still further problems.

Consider path MTU discovery, for example. Networks of an internet have different maximum packet sizes. Sometimes this fact can be administered by fragmenting packet too large for a particular link. Another way to administer the fact of differing maximum packet sizes is to determine what the maximum packet size that all networks between the source and destination can handle by sending large packets and receiving ICMP messages back from routers along the way regarding maximum packet sizes. This second process is called 'path MTU discovery.' Sources implementing path MTU discovery typically send IP packets with the 'don't fragment' bit set in the IP header. Then, when a router cannot deliver the packet to the next hop, it will return an ICMP 'Destination Unreachable' message to indicate that the packet cannot be processed. The MTU for the next network hop is encoded in this ICMP Destination Unreachable message, advising the originating source of the size the packet should be when it is re-sent. The source therefore can iteratively determine the largest packet size that can be sent without fragmentation to a destination.

This situation is common enough so that some system administrators disable the ICMP service on routers under their jurisdiction. This is practice that causes still further problems. A problem occurs when a system administrator of a router between the source and the destination has been disabled ICMP on the router. In this case, the source cannot know what to do. It never receives an acknowledgement for the message it sent, yet no ICMP Destination Unreachable packet is returned to inform it that something went wrong. In this situation, accurate path MTU discovery is practically impossible. For all these reasons, improvements are needed in determining availability of a destination for computer network communications.

SUMMARY OF THE INVENTION

Exemplary methods, systems, and products are described for determining availability of a destination for computer network communications that include providing on a caching device a destination availability cache including at least one cache entry representing availability of a destination and providing, from the caching device to a source, through computer network communications, information indicating the availability of the destination. In typical embodiments, the cache entry includes a network address of a destination device and a time limitation for the cache entry.

In some embodiments, the caching device is implemented as a node on a data communications route between a source and a destination, and providing a destination availability cache further includes determining availability of the destination and storing, in the destination availability cache, a cache entry representing the availability of the destination. In such embodiments, the destination typically has a network address, and providing information indicating availability of the destination includes receiving in a caching device an Internet Control Message Protocol ('ICMP') echo message transmitted from the source to the destination at the destination's network address; finding in the destination availability cache a cache entry bearing the destination's network address; dropping the ICMP echo message; and transmitting from the caching device to the source an ICMP echo reply message indicating availability of the destination.

In some embodiments, the caching device is implemented as a Domain Name Service ("DNS") server, and providing a destination availability cache includes receiving from a node in a data communications route between a source and a destination a DNS message indicating availability of the destination device for network communications and storing, in the destination availability cache, a cache entry representing the availability of the destination. In such embodiments, the source and the destination may each be a node in the data communications route between the source and the destination. In such embodiments, providing information indicating availability of a destination device for network communications may include receiving in the DNS server a DNS request message that includes a domain name of a destination; resolving the domain name to a network address of the destination; finding in the destination availability cache a cache entry bearing the destination's network address; and transmitting to the source device a DNS response message including the information indicating the availability of the destination.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

Figure 1:
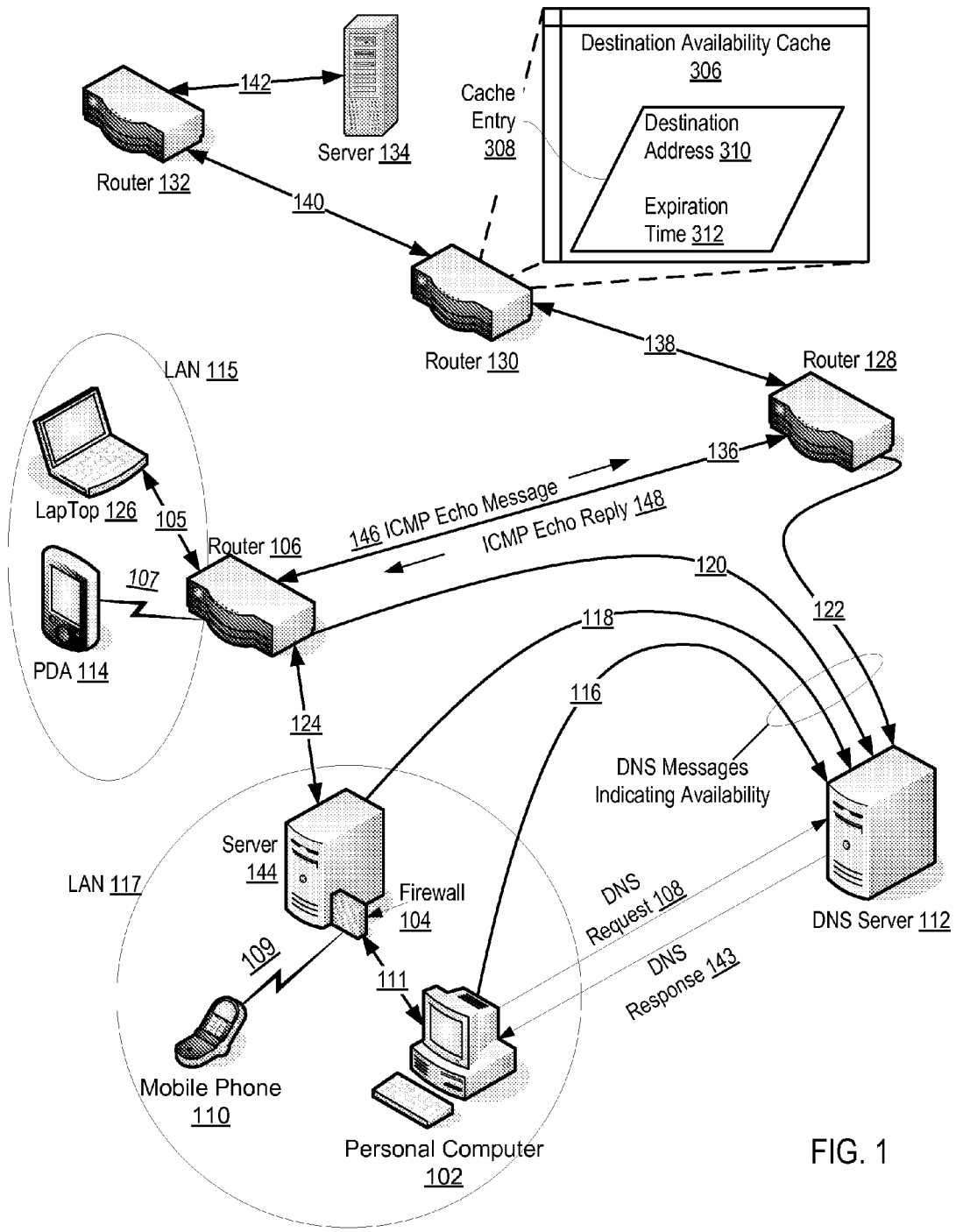
FIG. 1 sets forth a network diagram illustrating an exemplary system for determining availability of a destination for computer network communications according to embodiments of the present invention.

The present invention is described to a large extent in this specification in terms of methods for determining availability of a destination for computer network communications. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

GLOSSARY OF TERMS

The following terms are used generally in this specification, subject to context, as defined here:

'DNS' stands for Domain Name Service.

'Endnode'—a computer attached to a network for data communications. Other terms with the same meaning include: 'host' in the IP community, 'Data Terminal Equipment' or 'DTE' in the X.25 standard, 'End System' or 'ES' in ISO terminology, sometimes referred to as a 'station.' To some extent, whether a node is an endnode depends on its role. A source originating data communications is considered an endnode. A destination to which a communication is addressed is considered an endnode. A router may be considered an endnode when it originates a message or when a message from a source is addressed directly to a router.

'ISO' stands for International Standards Organization.

'ICMP' stands for Internet Control Message Protocol.

'IP' stands for Internet Protocol.

'LAN'—a network among computers or 'nodes' with a shared local medium, an Ethernet, for example, with broadcast capability and logical connectivity, typically over a limited geographic area such as a building or a campus.

'Network'—two or more computers connected through routers for data communications.

'Node'—refers to both endnodes and routers.

'PDA'—Personal Digital Assistant.

'Router'—an automated packet switch that connects LANs to form WANs. In ISO terminology, a router is called an 'intermediate systems' or 'IS,' in IP terminology, a 'gateway,' sometimes a 'switch' or a 'layer-3 switch.' Routers are often implemented as software program instructions on a general purpose computer but may also be implemented as special purpose devices.

'WAN'—a network in which LANs are connected through routers.

Determining Availability of a Destination for Computer Network Communications Exemplary methods, systems, and products for determining availability of a destination for computer network communications according to embodiments of the present invention are described with reference to the accompanying drawings, beginning with FIG. 1. FIG. 1 sets forth a network diagram illustrating an exemplary system for determining availability of a destination for computer network communications according to embodiments of the present invention. In the system of FIG. 1, routers (106, 128, 130, 132) are connected for data communications (136, 138, 140), forming a WAN. Laptop computer (126) is connected through wireline connection (105) to router (106), forming a LAN (115) with PDA (114) which is connected to router (106) through wireless connection (107). The system of FIG. 1 includes data communications server (144) which forms a LAN (117) with mobile phone (110), which is connected to server (144) through wireless connection (109), and personal computer (102), which is connected to server (144) through wireline connection (111). Server (144) provides gateway services to LAN (117), including firewall service (104). Server (144) connects LAN (117) to the WAN through connection (124) to router (106). In the system of FIG. 1, server (134) represents a data communications destination, and data communications sources are represented by several devices: laptop (126), PDA (114), mobile phone (110), and personal computer (102).

The system of FIG. 1 exemplifies the capabilities of providing on a caching device a destination availability cache (306) that includes a cache entry (308) representing availability of a destination and providing, from the caching device to a source, through computer network communications, information indicating the availability of the destination. In this example, the cache entry includes a network address (310) of a destination device and a time limitation (312) for the cache entry.

The time limitation is an indication of the time after which a cache entry should be considered too stale to be a reliable representation of destination availability and disregarded or destroyed. In this example, the time limitation is represented by an expiration time (312) for the cache entry, although the use of an expiration time is only for explanation, not for limitation of the invention. Alternatively, a time limitation for a cache entry may be implemented as a time stamp of the time when the cache entry is created or refreshed and a 'TTL' or 'time-to-live' field. For example, a cache entry representing availability of a destination may be created with a destination address, a time stamp of the time when the cache entry is created, and a TTL field set to one hour. After expiration of the hour so identified, the caching device bearing this cache entry would no longer rely on this cache entry to provide information indicating the availability of the destination.

In the example of FIG. 1, a caching device may be any node on a data communications route between the source and the destination. In particular any router may be a caching device. A router (130) may provide a destination availability cache within the router by determining availability of a destination and storing, in a destination availability cache (306) in computer memory of the router, a cache entry (308) representing the availability of the destination. Determining availability of a destination may be carried out by examining the source address in an ICMP echo reply message (148) from a destination to see whether the source address is in the cache.

The ICMP is a client server application. An ICMP server executes on all IP endnodes and all IP routers. ICMP is used to report problems with delivery of IP messages within an IP network. It can be used to show when a particular destination is not responding, when an IP network is not reachable, when a node is overloaded, when an error occurs in the IP header information, and so on. ICMP is also frequently used by Internet managers to verify correct operations of endnodes and to check that routers are correctly routing packets to destination addresses. An example of an ICMP message is a message from a router to a source if the MTU of a link on the route to a destination is smaller than size of the IP packet, and the packet has the Don't Fragment (DF) bit set in the IP packet header. The ICMP message is returned to the source address specified in the IP packet that suffered the problem. ICMP messages are sent using the basic IP header with an ICMP header inserted in the front of the user data field in the IP packet. The first octet of the data portion of an ICMP message is a ICMP type field; the value of this field determines the format of the remaining data. An ICMP echo message has Type '8,' and an ICMP echo reply message has Type '0.'

Note that the source address of an echo reply message is a destination's network address. The echo reply message is sent from a destination to a source of an echo message—so the source address field on the echo reply message bears the network address of a destination. If the source address value from the echo reply message is not already represented as a destination address a cache entry in the cache, the router may create and store a cache entry bearing the destination's network address, taken from the source address field in the echo reply message, and also bearing a time limitation such as an expiration time. If the source address on the echo reply message is already in a cache entry in the destination availability cache, the router may refresh that cache entry by updating its time limitation.

A router may provide information indicating availability of the destination when a router receives an ICMP echo message (146) transmitted from a source to a destination at the destination's network address by finding in a destination availability cache a cache entry bearing the destination's network address, dropping the ICMP echo message, and transmitting from the router to the source an ICMP echo reply message (148). An ICMP echo reply message is an indication to a source that a destination is available for network communications.

In the system of FIG. 1, a caching device may be implemented as a DNS server (112). The Domain Name System ("DNS") is a name service typically associated with the internets and defined in several IETF RFCs, including particularly RFC 1035. The DNS translates domain names in network addresses. The domain names are names of computers connected to the network such as web servers, email servers, and others. The network addresses are the network addresses of the computers on the network. In the example of an internet, that is, a network whose routers transmit and receive data communication according to the Internet Protocol, the network addresses are internet protocol ("IP") addresses. Domain names are expressed in alphabetic text, easier for humans to work with than numeric network addresses. Networks, however, operate on numeric network addresses. Every time a user requests a resource by use of a domain name, therefore, a DNS service somewhere translates the domain name into a corresponding network address. The domain name "ibm.com," for example, might translate into the IP network address 129.42.19.99. The DNS is actually a network in its own right, a network of DNS servers. If one DNS server is unable to translate a particular domain name, that server can obtain additional information from other DNS servers in the network.

DNS servers use 'resource records' to store the attributes of domain names. Each domain name may have many attributes stored in resource records associated with the domain name. DNS servers use a request-response communications protocol to provide resource records to DNS clients. Many resource record types are defined in the pertinent RFCs, including resource records, for example, that describe a host address for a domain name, canonical names for aliases, host CPUs and operating systems, and domain names of hosts willing to act as mail exchanges for a domain. DNS servers provide a request/response data communications protocol with standard message types. When a source receives a network address from a DNS server, it can use the network address to access a destination identified by the domain name associated with the network address. The destination may be any computer connected to the network.

In the example of FIG. 1, A DNS server (112) may provide a destination availability cache by receiving from a node in a data communications route between a source and a destination a DNS message indicating availability of a destination device for network communications and storing, in a destination availability cache on the DNS server, a cache entry representing the availability of the destination. The destination cache (306) and cache entry (308) may be similar to those described in FIG. 1 as provided on router (130), the cache entry (308) characterized by a destination address (310) and a time limitation such as an expiration time (312), and so on. A node in a data communications route between a source and a destination may include the endpoints of the route. That is, the source and the destination are considered nodes in the data communications route between the source and the destination, and the source and the destination themselves may transmit to a DNS server a DNS message indicating availability of the destination device for network communications. In the example of FIG. 1, source endpoint personal computer (102), having received an ICMP echo reply message indicating availability of a destination, transmits a DNS message to DNS server (112) a DNS message (116) indicating availability of a destination for network communications. Similarly, DNS server (112) receives from server (144), router (106), and router (128) DNS messages (118, 120, 122) indicating availability of a destination device—each of these nodes having determined availability of the destination upon which each reports by detecting an ICMP echo reply message identifying the destination as available.

DNS server (112) may provide information indicating availability of a destination device for network communications by receiving a DNS request message that includes a domain name of a destination; resolving the domain name to a network address of the destination; finding in the destination availability cache a cache entry bearing the destination's network address; and transmitting to the source device a DNS response message including the information indicating the availability of the destination. In the example of FIG. 1, DNS server (112) receives (108) a DNS request message that includes a domain name of a destination from source endpoint personal computer (102). The DNS request message (108) may be of a new type indicating that the source is improved for determining availability of a destination according to embodiments of the present invention. The DNS server (112) then resolves the domain name by finding in its memory a resource record for the domain name. DNS server (112) also finds in memory, in a destination availability cache, a cache entry bearing the destination's network address, representing availability of the destination. DNS server (112) fashions a new type of DNS response (143) message bearing not only the destination address but also an indication of availability of the destination and transmits to the source device (102) the DNS response message including the indication of the availability of the destination.

The exemplary characteristics of DNS server (112) as just described include separate storage of DNS address resource records (Type A resource records) and a destination availability cache. As an alternative, a new type of DNS resource may store both the destination network address as well as data indicating availability, for example, an availability time-to-live or an availability expiration time. Such an arrangement may effectively implement a destination availability cache as part of the DNS resource records, thereby reducing the need for separate storage for the destination availability cache—and also reducing the need for separate lookups for the DNS resource record and the corresponding cache entry.

Determining availability of a destination in accordance with the present invention is generally implemented with computers, that is, with automated computing machinery. In the system of FIG. 1, for example, all the nodes, servers, and communications devices are implemented to some extent at least as computers. For further explanation, therefore, FIG. 2 sets forth a block diagram of automated computing machinery comprising an exemplary computer (152) useful in determining availability of a destination according to embodiments of the present invention. The computer (152) of FIG. 2 includes at least one computer processor (156) or 'CPU' as well as random access memory (168) ("RAM") which is connected through a system bus (160) to processor (156) and to other components of the computer.

Stored in RAM (168) is an IP module (190), computer program instructions for internet communications which may be present in any node of an IP network. Also stored RAM (168) is a gateway module (194), computer program instructions for routing internet packets which may be present in any router. Also stored in RAM (168) is ICMP module (192), a set of computer program instructions improved for determining availability of a destination according to embodiments of the present invention that may be present in any node of an IP network. Also stored in RAM (168) is a DNS module (162), computer program instructions improved for determining availability of a destination according to embodiments of the present invention that may be present in any node of an IP network: representing client-side DNS functionality in most nodes and DNS server functionality in DNS servers. Also stored in RAM (168) is a destination availability cache (306) that may be used by an IP module, an ICMP module, a gateway module, or a DNS module for determining availability of a destination according to embodiments of the present invention.

Also stored in RAM (168) is an operating system (154). Operating systems useful in computers according to embodiments of the present invention include UNIX™, Linux™, Microsoft NT™, AIX™, IBM's i5os, and many others as will occur to those of skill in the art. Operating system (154), IP module (190), ICMP module (192), gateway module (194), DNS module (162), and destination availability cache (306) in the example of FIG. 2 are shown in RAM (168), but many components of such software typically are stored in non-volatile memory (166) also.

Figure 2:
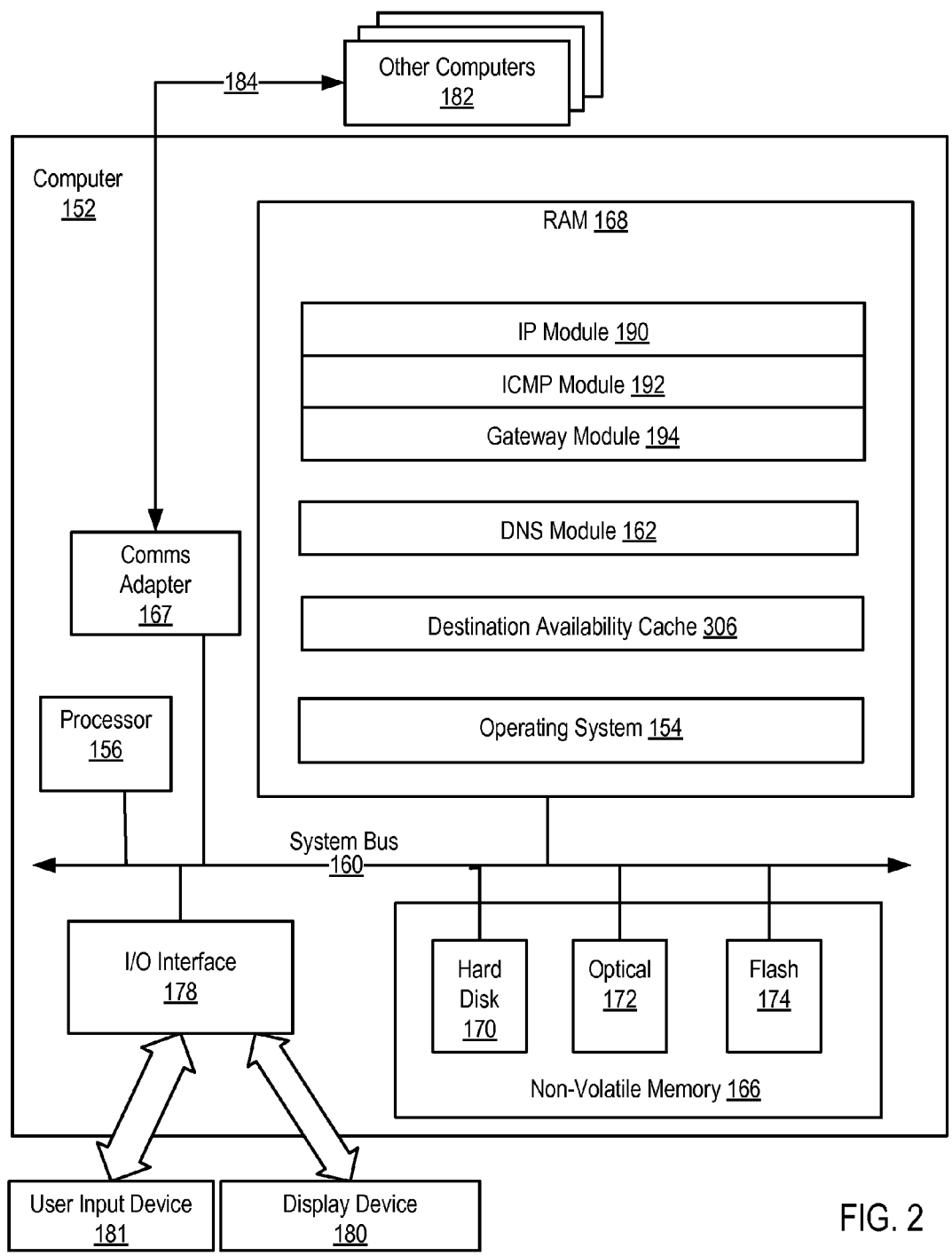
FIG. 2 sets forth a block diagram of automated computing machinery comprising an exemplary computer useful in determining availability of a destination according to embodiments of the present invention.

Computer (152) of FIG. 2 includes non-volatile computer memory (166) coupled through a system bus (160) to processor (156) and to other components of the computer (152). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example computer of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary computer (152) of FIG. 2 includes a communications adapter (167) for implementing data communications (184) with other computers (182). Such data communications may be carried out through serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful for determining availability of a destination according to embodiments of the present invention include modems for wired dial-up communications, Ethernet (IEEE 802.3) adapters for wired network communications, and 802.11b adapters for wireless network communications.

Figure 3:
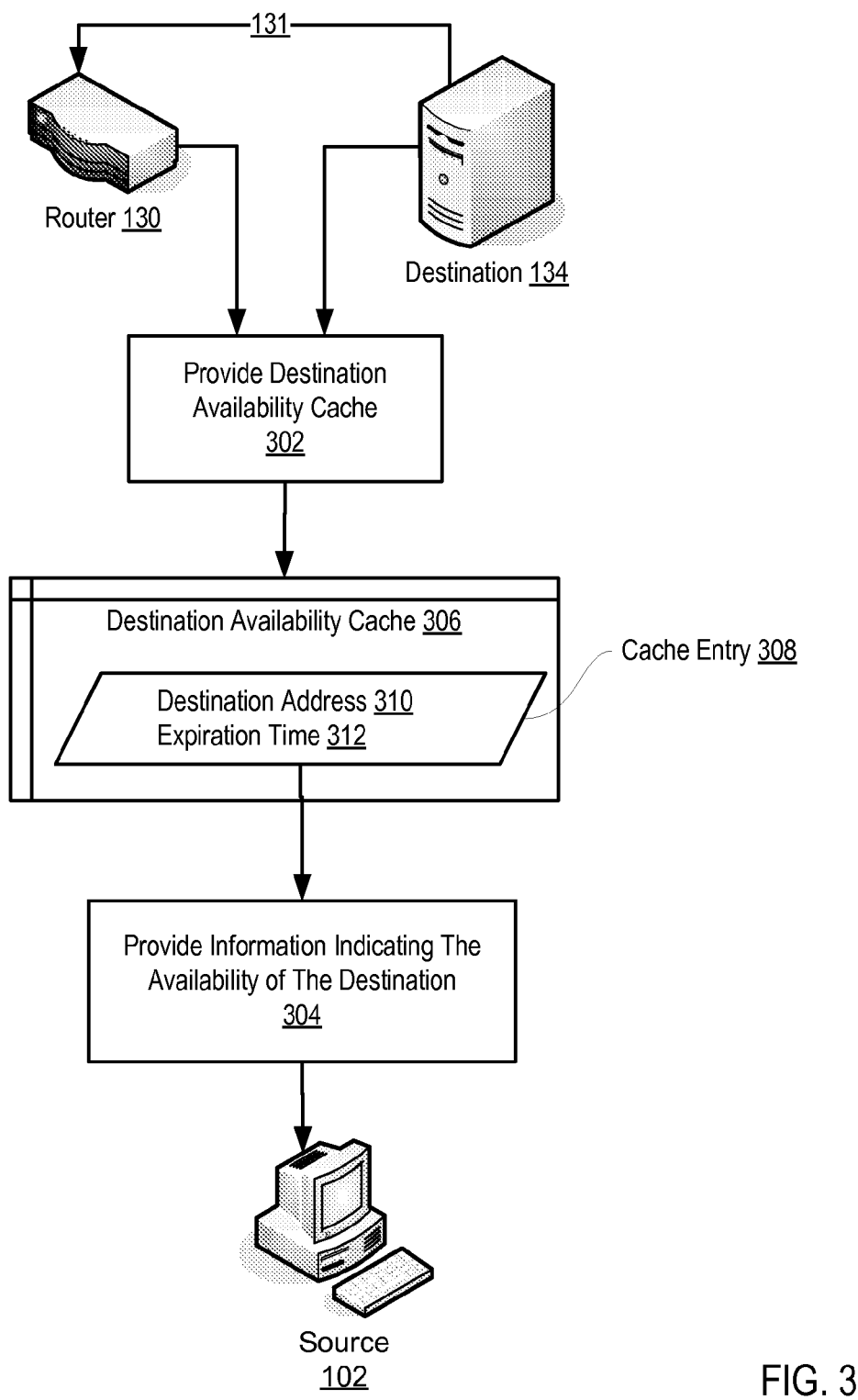
FIG. 3 sets forth a flow chart illustrating an exemplary method for determining availability of a destination for computer network communications FIG. 4 sets forth a flow chart illustrating an exemplary method for determining availability of a destination for computer network communications where a caching device is implemented as a node on a data communications route between a source and a destination.

For further explanation, FIG. 3 sets forth a flow chart illustrating an exemplary method for determining availability of a destination (134) for computer network communications according to embodiments of the present invention that includes providing (302) on a caching device a destination availability cache (306) that includes at least one cache entry (308) representing availability of a destination and providing (304), from the caching device to a source (102), through computer network communications, information indicating the availability of the destination. In the method of FIG. 3, the cache entry includes a network address (310) of a destination device and a time limitation (312) for the cache entry. In this example, the time limitation (312) is represented by an expiration time. In this example, an indication of the availability of the destination (134) may be received, as an ICMP echo reply for example, either directly from the destination or alternatively from a router (130) in a communication route (131) between the caching device and the destination.

Figure 4:
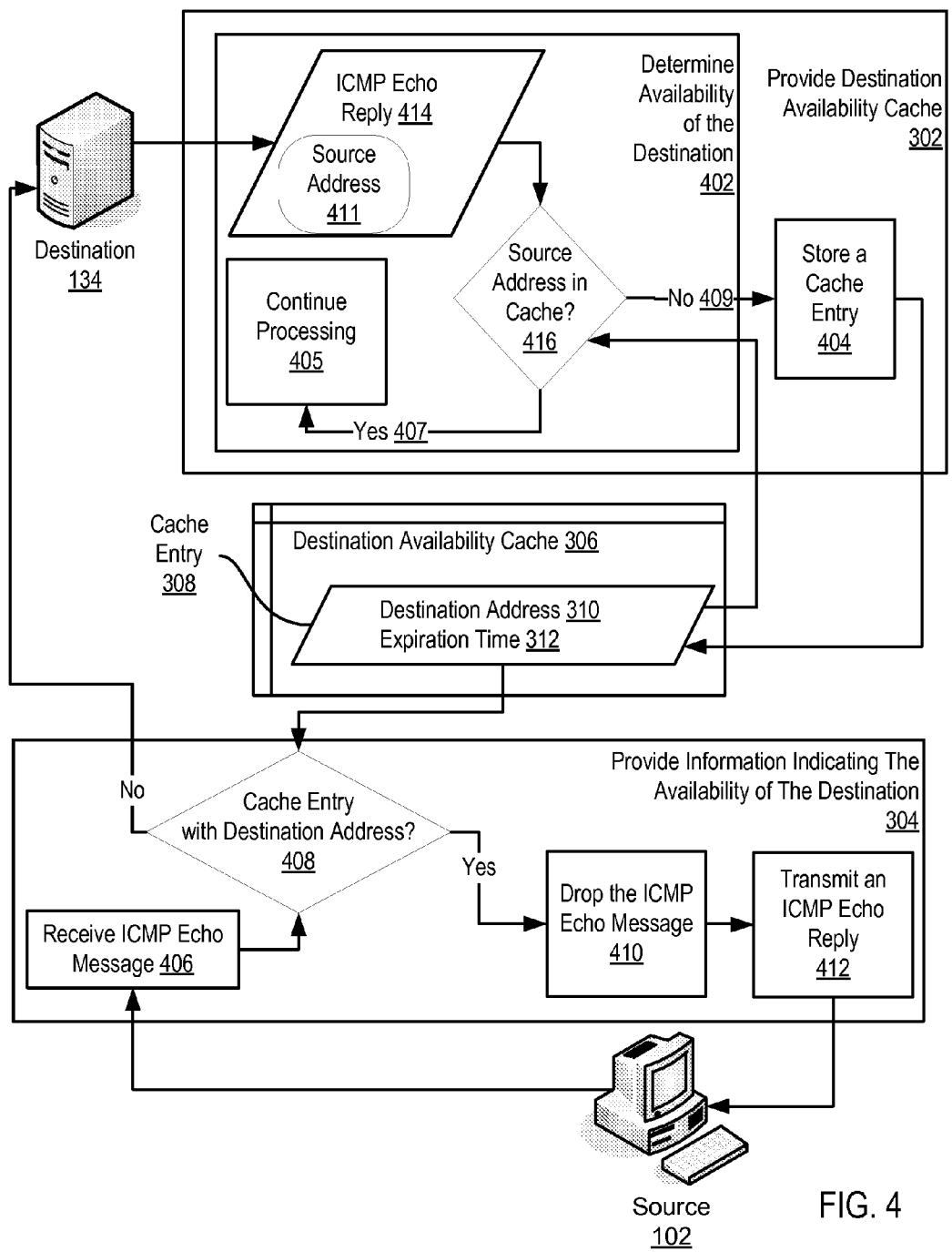

For further explanation, FIG. 4 sets forth a flow chart illustrating an exemplary method for determining availability of a destination for computer network communications according to embodiments of the present invention where a caching device is implemented as a node on a data communications route between a source (102) and a destination (134). The method of FIG. 4 includes providing (302) on a caching device a destination availability cache (306) comprising at least one cache entry (308) representing availability of a destination and providing (304), from the caching device to a source (102), through computer network communications, information indicating the availability of the destination. In the method of FIG. 4, providing a destination availability cache is carried out by determining (402) availability of the destination and storing (404), in the destination availability cache (306), a cache entry (308) representing the availability of the destination.

In the method of FIG. 4, determining (402) availability of the destination includes searching (416) cache entries (308) in a destination availability cache (306) to determine whether the cache contains a cache entry bearing the source address (411) of an ICMP echo reply message (404). If the source address is already listed (407) in the cache (306) as a destination address (310) for an available destination, then processing of the echo reply message continues normally (405). If the source address (411) of the ICMP echo reply message (414) is not already listed (409) in the cache (306) as a destination address (310) for an available destination, the method includes storing (414) a cache entry (308) representing the availability of the destination (134) identified by the source address in the ECMP echo reply message.

In the example of FIG. 4, the destination (134) has a network address, and providing information indicating availability of the destination includes receiving (406) in a caching device an Internet Control Message Protocol ('ICMP') echo message transmitted from the source to the destination at the destination's network address. In the example of FIG. 4, providing information indicating availability of the destination also includes finding (408) in the destination availability cache a cache entry bearing the destination's network address. That is, if there is no cache entry (308) bearing the same destination address (310) as the ICMP echo message, then the ICMP echo message is forwarded along to its destination in the usual fashion (134). If there is a cache entry (308) bearing the same destination address as the ICMP echo message, then in the example of FIG. 4, providing information indicating availability of the destination (304) also includes dropping (410) the ICMP echo message and transmitting (412) from the caching device to the source an ICMP echo reply message indicating availability of the destination.

Cache entries (308) in destination availability cache (306) bear a time limitation, in this case, an expiration time (312). Finding (408) in the destination availability cache a cache entry bearing the destination's network address in this example therefore advantageously includes determining whether the cache entry has expired by comparing the expiration time with the current time. Alternatively, cache entries may be implemented with time limitations represented by time stamps, on a caching device programmed to scan the cache entries periodically and delete expired cache entries. In such a caching device, finding (408) in the destination availability cache a cache entry bearing the destination's network address would always represent finding a cache entry representing an available destination because the cache would contain no expired cache entries. Persons of skill in the art may think of other ways of implementing time limitations on cache entries in destination availability caches, and all such ways are well within the scope of the present invention.

Dropping (410) the ICMP echo message and transmitting (412) from the caching device to the source an ICMP echo reply message indicating availability of the destination can be carried out by reversing the source address and the destination address in the ICMP echo reply message, changing the type code in the ICMP echo message from 8 to 0 (thereby converting the ICMP echo reply message into an ICMP echo reply message), and transmitting the ICMP echo reply message so created from a caching device to the source address—now converted into the destination address in the new ICMP response message. The ICMP echo message is said to be 'dropped' because its travel toward its original destination stops at the caching device, where the ICMP echo message as such is destroyed, replaced with an ICMP echo reply directed back toward the source of the echo message.

Figure 5:
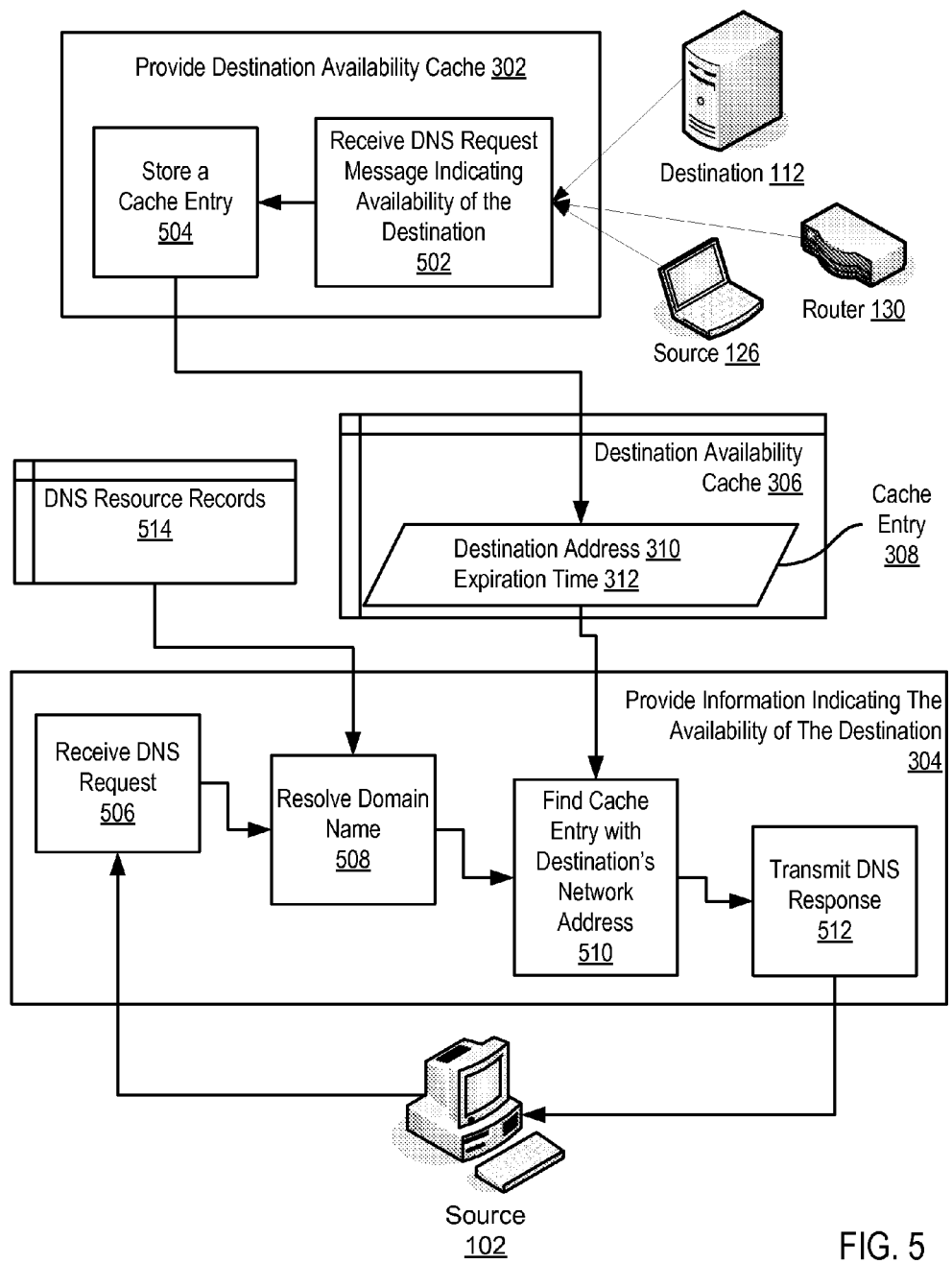
FIG. 5 sets forth a flow chart illustrating an exemplary method for determining availability of a destination for computer network communications where a caching device is implemented as a DNS server.

For further explanation, FIG. 5 sets forth a flow chart illustrating an exemplary method for determining availability of a destination for computer network communications according to embodiments of the present invention where a caching device is implemented as a DNS server. In the example of FIG. 5, providing (302) a destination availability cache (306) includes receiving (502) from a node (112, 126, 130) in a data communications route between a source and a destination a DNS message indicating availability of the destination device for network communications and storing (504), in the destination availability cache (306), a cache entry (308) representing the availability of the destination.

The DNS message is a new type of DNS message implemented for determining availability of a destination according to embodiments of the present invention. Because any node in a communication route, including the endnodes, may acquire information regarding availability of a destination (by, for example, receiving an ICMP echo reply from the destination), any node in the route may send such a DNS message to a DNS server improved for determining availability of a destination according to embodiments of the present invention. A source (126) may send such a DNS message upon receiving an ICMP echo reply. A destination (112) may send such a DNS message upon transmitting an ICMP echo reply. A router (130) may send such a DNS message upon receiving forwarding an ICMP echo reply from a destination to a source.

In the example of FIG. 5, providing information indicating availability of a destination device for network communications includes receiving (506) in the DNS server a DNS request message that includes a domain name of a destination. The DNS request message may be a new DNS message designated, for example, Type AA (denoting a request for both an Address and Availability), the receipt of which identifies a requesting source as a source improved for determining availability of a destination for computer network communications according to embodiments of the present invention. That is, this source is one that can make sense of a DNS reply that includes not only a network address of the destination but also availability information for the destination.

In the example of FIG. 5, providing information indicating the availability of the destination (304) includes resolving (508) the domain name to a network address of the destination, carried out, for example, by finding a DNS address-type resource record (514) associated with the domain name and bearing the network address of the destination. Cache entries (308) in destination availability cache (306) bear a time limitation, in this case, an expiration time (312). Finding (510) in the destination availability cache a cache entry bearing the destination's network address in this example therefore advantageously includes determining whether the cache entry has expired by comparing the expiration time with the current time. Alternatively, cache entries may be implemented with time limitations represented by time stamps, on a caching device programmed to scan the cache entries periodically and delete expired cache entries. In such a caching device, finding (510) in the destination availability cache a cache entry bearing the destination's network address would always represent finding a cache entry representing an available destination because the cache would contain no expired cache entries. Persons of skill in the art may think of other ways of implementing time limitations on cache entries in destination availability caches, and all such ways are well within the scope of the present invention.

Having found the network address of the destination, providing information indicating the availability of the destination (304) in the method of FIG. 5 also includes finding (510) in the destination availability cache (306) a cache entry (308) bearing the destination's network address and transmitting (512) to the source device a DNS response message that includes information indicating the availability of the destination. In this example, the cache entry bears an expiration time (312)—so the information indicating the availability of the destination may be implemented as a field in the DNS response message that is assigned the value '1' if the current time is earlier than the expiration time and the value '0' if the current time is later than the expiration time. The value '1' in this example is information indicating availability in the sense that the destination was known to be available at some point in the reasonably recent past—and therefore may reasonably be treated as available now. The value '0' in this example is information indicating availability in the sense that the destination was not known, to the caching device at least, to be available at any point in the reasonably recent past—and therefore ought not be treated as available based on any information from this caching device at this time. Alternatively, rather than a Boolean field indicating availability, the DNS response message may include a time-to-live field or an expiration time, so that the source may decide for itself regarding availability. Other ways of implementing information indicating availability may occur to those of skill in the art, and all such ways are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A system for determining availability of a destination for computer network communications, the system comprising:
    a caching device having a computer processor coupled to computer memory, the caching device further comprising a destination availability cache comprising at least one cache entry representing availability of a destination, wherein the cache entry comprises a network address of a destination device and a time limitation for the cache entry, wherein the time limitation is an indication of the time after which a cache entry should be considered too stale to be a reliable representation of destination availability, and wherein the caching device further comprises a node on a data communications route between a source and the destination, and wherein the computer processor is operable to execute program instructions in the computer memory to:
    responsive to receiving, in the caching device, an Internet Control Message Protocol ('ICMP') echo message transmitted from the source to a requested destination at a requested destination's network address, search the destination availability cache for a cache entry bearing the requested destination's network address;
    responsive to determining an absence of a cache entry bearing the requested destination's network address, forward the ICMP echo message to the requested destination;
    responsive to finding a cache entry bearing the requested destination's network address in the destination availability cache, drop the ICMP echo message and transmit from the caching device to the source an ICMP echo reply message indicating availability of the requested destination.

2. The system of claim 1, wherein the computer processor is operable to execute the program instructions to delete expired cache entries from the destination availability cache.

3. The system of claim 1, wherein the computer processor is operable to execute the program instructions to:
    responsive to receiving an ICMP echo reply message from the requested destination, search the destination availability cache for a cache entry bearing the requested destination's network address; and
    responsive to determining an absence of a cache entry in the destination availability cache bearing the requested destination's network address, store in the destination availability cache an entry bearing the requested destination's network address.

4. The system of claim 1, wherein the computer processor is operable to execute the program instructions to:
    responsive to receiving an ICMP echo reply message from the requested destination, search the destination availability cache for a cache entry bearing the requested destination's network address; and
    responsive to identifying a cache entry in the destination availability cache bearing the requested destination's network address, updating the time limitation associated with the cache entry.

* * * * *